(12) United States Patent
Bell et al.

(10) Patent No.: US 12,115,500 B2
(45) Date of Patent: *Oct. 15, 2024

(54) SEPARATION SYSTEMS FOR REMOVING STARCH AND OTHER USABLE BY-PRODUCTS FROM PROCESSING WATER

(71) Applicant: SMARTFLOW TECHNOLOGIES, INC., Sanford, NC (US)

(72) Inventors: Jason Bell, Pleasant Dale, NE (US); Mark Vander Hoff, Apex, NC (US); Todd Benson, Cary, NC (US); Marc Pugh, Sanford, NC (US); Joseph Peters, Greensboro, NC (US)

(73) Assignee: SMARTFLOW TECHNOLOGIES, INC., Sanford, NC (US)

( * ) Notice: Subject to any disclaimer, the term of this patent is extended or adjusted under 35 U.S.C. 154(b) by 542 days.

This patent is subject to a terminal disclaimer.

(21) Appl. No.: 17/379,337

(22) Filed: Jul. 19, 2021

(65) Prior Publication Data

US 2021/0346845 A1 Nov. 11, 2021

Related U.S. Application Data

(62) Division of application No. 16/260,742, filed on Jan. 29, 2019, now Pat. No. 11,065,581, which is a
(Continued)

(51) Int. Cl.
*B01D 63/08* (2006.01)
*B01D 61/58* (2006.01)
(Continued)

(52) U.S. Cl.
CPC .......... *B01D 63/082* (2013.01); *B01D 61/58* (2013.01); *C02F 1/44* (2013.01); *C08B 30/08* (2013.01);
(Continued)

(58) Field of Classification Search
CPC .. B01D 63/082; B01D 61/58; B01D 2311/04; B01D 2311/2649; B01D 2311/2676;
(Continued)

(56) References Cited

U.S. PATENT DOCUMENTS 2,475,261 A 7/1949 Slotter et al.
3,988,483 A 10/1976 Deyoe et al.
(Continued)

FOREIGN PATENT DOCUMENTS

CN 102119773 A 7/2011
CN 102204704 A 10/2011
(Continued)

OTHER PUBLICATIONS

Rosenau, John R., et al.; "Low Wastewater Potato Starch/Protein Production Process," EPA-600/2-79-208, Industrial Environmental Research Laboratory, Dec. 1979, Grant No. R-803712, pp. 1-50.
(Continued)

*Primary Examiner* — Joseph W Drodge
(74) *Attorney, Agent, or Firm* — Casimir Jones, SC; Tristan A. Fuierer

(57) ABSTRACT

The present invention provides for a method for separating starch from processing solutions containing starch containing plants or roots such as potatoes, sweet potatoes, wheat, corn, tapioca, yams, cassaya, sago, rice, pea, broad bean, horse bean, sorghum, konjac, rye, buckwheat and barley to provide commercially acceptable starch while reducing disposal of solid or liquid waste matter into landfills or water treatment facilities.

9 Claims, 4 Drawing Sheets

Related U.S. Application Data division of application No. 15/513,724, filed as application No. PCT/US2015/044794 on Aug. 12, 2015, now Pat. No. 10,220,349.

(60) Provisional application No. 62/060,738, filed on Oct. 7, 2014.

(51) Int. Cl.

| | | |
|---|---|---|
| *C02F 1/44* | (2023.01) | |
| *C08B 30/08* | (2006.01) | |
| *C08B 30/10* | (2006.01) | |
| *C02F 103/32* | (2006.01) | |

(52) U.S. Cl.
CPC .......... *C08B 30/10* (2013.01); *B01D 2311/04* (2013.01); *B01D 2311/2649* (2013.01); *B01D 2311/2676* (2013.01); *B01D 2313/08* (2013.01); *B01D 2313/105* (2013.01); *B01D 2315/10* (2013.01); *B01D 2317/022* (2013.01); *B01D 2317/025* (2013.01); *B01D 2319/022* (2013.01); *B01D 2319/025* (2013.01); *C02F 2103/32* (2013.01); *C02F 2301/08* (2013.01)

(58) Field of Classification Search
CPC .......... B01D 2313/08; B01D 2313/105; B01D 2315/10; B01D 2317/022; B01D 2317/025; B01D 2319/022; B01D 2319/025; B01D 63/0822; B01D 2317/02; B01D 2319/02; C02F 1/44; C02F 2103/32; C02F 2301/08; C08B 30/08; C08B 30/10; C08B 3/02; C08B 3/08; C08B 3/10

See application file for complete search history.

(56) References Cited

U.S. PATENT DOCUMENTS

| | | | |
|---|---|---|---|
| 5,997,652 A | 12/1999 | Potter et al. | |
| 7,465,398 B1 | 12/2008 | Robert et al. | |
| 10,220,349 B2 | 3/2019 | Bell et al. | |
| 10,934,222 B2 * | 3/2021 | Vander Hoff | C02F 1/444 |
| 11,065,581 B2 * | 7/2021 | Bell | C08B 30/10 |
| 2002/0096473 A1 | 7/2002 | Ferro et al. | |
| 2003/0092136 A1 | 5/2003 | Delobeau | |
| 2003/0205514 A1 | 11/2003 | Potter et al. | |
| 2005/0173330 A1 * | 8/2005 | Osenar | B01D 63/081 |
| | | | 210/321.75 |
| 2006/0029715 A1 | 2/2006 | Cheryan | |
| 2014/0045236 A1 * | 2/2014 | Benson | C12M 21/12 |
| | | | 585/242 |
| 2014/0315259 A1 * | 10/2014 | Woods | C12P 19/14 |
| | | | 435/165 |
| 2016/0016117 A1 | 1/2016 | Benson et al. | |
| 2017/0304774 A1 | 10/2017 | Bell et al. | |

FOREIGN PATENT DOCUMENTS

| | | |
|---|---|---|
| CN | 103450362 A | 12/2013 |
| JP | 2009034022 A | 2/2009 |
| WO | 9807333 A1 | 2/1998 |
| WO | 2012115932 A2 | 8/2012 |

OTHER PUBLICATIONS

International Search Report/Written Opinion for PCT/US2015/044794; Jan. 14, 2016.

Kuipers, Norbert, J.M. et al.; "Gas-Solid Hydroxyethylation of Potato Starch in a Stirred Vibrating Fluidized Bed Reactor," Starch/Starke, Journal for the Investigation, Processing and Use of Carbohydrates and Their Derivatives, 1996, pp. 22-29, vol. 48.

European Extended Search Report for EP15849430.2, dated May 2, 2018.

Been Huang Chiang, et al.; "Ultrafiltration and Reverse Osmosis of the Waste Water from Sweet Potato Starch Process" Journal of Food Science, 1986, pp. 971-974, vol. 51.

European Office Action for EP 15849430.2, dated Jun. 26, 2019.

"Cross Flow Filtration method handbook," 2014; XP055198384; URL: http://www.gelifesciences.com/gehcls_images/GELS/RelatedContent/Files/1392028292867/litdoc29085076_20140313045908.pdf.

Ramesh R. Bhave, Chapter 7, Cross-Flow Filtration, In: "Fermentation and Biochemical Engineering Handbook: Principles, process Design and Equipment," 1996, XP055520677, pp. 271-322.

* cited by examiner

SEPARATION SYSTEMS FOR REMOVING STARCH AND OTHER USABLE BY-PRODUCTS FROM PROCESSING WATER

CROSS-REFERENCE TO RELATED APPLICATION

This application is filed under the provisions of 35 U.S.C. § 121 and is a divisional of U.S. patent application Ser. No. 16/260,742 filed on Jan. 29, 2019, now U.S. Pat. No. 11,065,581, which is a divisional of U.S. patent application Ser. No. 15/513.724 filed on Mar. 23, 2017, now U.S. Pat. No. 10,220,349, which was filed under the provisions of 35 U.S.C. § 371 and claims the priority of International Patent Application No. PCT/US2015/044794 filed on Aug. 12, 2015, which in turn claims priority to co-pending U.S. Provisional Application No. 62/060,738 filed on Oct. 7, 2014, the contents of which are incorporated by reference herein for all purposes.

BACKGROUND OF THE INVENTION

Field of Invention

The present invention provides for a method for separating process water by-products that consist of useable by-products, such as removing starch from processing solutions containing starch containing plants or roots such as from root plants such as potatoes, sweet potatoes, wheat, corn, tapioca, yams, cassaya, sago, rice, pea, broad bean, horse bean, sorghum, konjac, rye, buckwheat and barley while reducing disposal of solid or liquid waste matter into landfills or water treatment facilities.

Background of the Invention

In many food and dairy processing systems there is process water containing water, soluble organics and solid wastes. In the past, this process water has been filtered and often chemically cleaned or biologically degraded for disposal.

In most food processing facilities, there are process water by-products that consist of useable by-products, waste, soluble organic, and solid wastes. The process water typically includes an unacceptable level of organic waste products measured in terms of it. Generally, the Chemical Oxygen Demand (COD) level in an organic process stream is directly related to the carbon content in the process stream wherein the carbon content in the process stream is usually in the form of starch and or sugar. When an organic stream is injected into wastewater, the decomposition of the wastes depletes the oxygen supply in the water because oxygen is needed to oxidize the waste in the water, and thus, making it difficult to support animal life. In addition the components in the fluid stream being measured in terms of COD, the components of the fluid and fluid stream may be expressed as Biological Oxygen Demand (BOD or Total Suspended Solids (TSS). Each may have different threshold levels for waste treatment facilities. BOD measures the quantity of oxygen used in the aerobic stabilization of wastewater streams, is one of the most widely used measure of general organic pollution in wastewater. Total solids in wastewater are defined as the residue remaining upon evaporation at just above the boiling point. The total solids are composed of matter which is settle able in suspension or in solution, and can be organic, inorganic, or a mixture of both.

Many Federal, State and local regulation place strict controls on the discharge of process streams into the environment. As such, useable by-products should be separated from the process or waste streams in addition to other by-products and wastes. In addition to compliance with regulations, it is beneficial to remove usable by-products or process stream components from the streams where the by-products can be used in the manufacturing process thereby reducing cost or providing the sale of by-products to other entities at a profit thereby increasing the total revenue for the manufacturing concern.

Starch is a carbohydrate found in many foods. It is a white and tasteless substance that can be processed to make numerous products, some of which are sugars, thickeners for foods such as corn starch, laundry starch, and adhesives. When certain root plants, such as potatoes, sweet potatoes that include high starch content are sliced or diced or chipped the physical action of cutting through the plant cells releases starch that is usually rinsed off with fresh water before going into the fryers or the next process. The starch is carried with the wash down water through the effluent system and commonly will go to drain. Alternatively there will be some kind of effluent treatment but everything comes at a cost. The highest cost is no treatment at all in which case the producer will face high and ever increasing trade effluent charges based on the COD, BOD, and/or TSS levels in the waste that is going down the sewer for the water companies to treat.

Many processors will want to find a solution for minimizing this added COD/BOS/TSS waste load on their treatment facility and recover the potentially more valuable starch selling to other processers specializing in starch refining, such as the use in the production of animal feed. Notably, there is also an opportunity to sell the starch if it can be recovered because, for example, if potatoes are kept cold before slicing any starch released will have a value either as an animal feed or for sale to companies that specialize in refining starch for food, adhesives or other uses. Thus, it is important to find a way of capturing the starch before it ends up going down the drain.

Hydro-cyclones and/or centrifuge are commonly used for starch recovery but these generally produce a wetter and more unmanageable starch. Plus these systems typically do not efficiently recover a large amount of the starch, allowing a significant portion of the total amount of starch in the process water to remain suspended in the process water effluent from these treatments. Further, companies have to think about how they interact with the environment and reducing the pollution that goes down the drain is an obvious benefit to all concerned. Implementing a new and novel process that removes all or nearly all of the suspended starch in a process stream not only increases the total amount of starch recovered for sale or alternative use, it also provides a higher quality effluent of the process that may meet the manufacturers internal standards for process water inputs. Thus, there is also a possibility for reusing the clarified wash water which is certainly worth investigating.

In light of the above discussion, there is a need for separation systems that can be used continuously or non-continuously that can effectively separate starch from process or waste water to provide dewatered starch products, thereby providing value added separated product and solid free streams while producing a minimal amount of negative effects on wastewater treatment facilities.

SUMMARY OF THE INVENTION

In accordance with the present invention, there is provided a method to process starch removed from root plants such as potatoes or sweet potatoes and other sources such as wheat, corn, tapioca, yams, cassaya, sago, rice, pea, broad bean, horse bean, sorghum, konjac, rye, buckwheat and barley by dewatering thereby providing separated water and a concentrated viscous starch material.

In one aspect, the present invention provides for subjecting a process or waste water stream from processing of a starch containing source, wherein the process or waste water may be subjected to pretreatment to remove any unwanted solids, pulp, fibers, or debris by the use of screen meshing, centrifugal filter, or a similar filtering device; and a separation step wherein water is removed from the process or waste water with the use of a cross-flow filtration unit of the present invention to form a permeate water stream and a retentate starch stream.

A second purification step may be conducted on the permeate water stream to remove organic or inorganic products passed through the first cross-flow filtration unit and which would constitute excess waste levels for the local waste water treatment facility. For example biological oxygen demand (BOD) or total suspended solids (TSS) levels can be reduced using a second cross-flow filtration unit that comprises filtration membranes having increased rejection characteristics or smaller pore sizes, such as UF, NF, or RO membranes, than the first cross flow filtration unit to provide essentially clear water permeate stream. The retentate starch, proteins and/or sugar containing stream is moved on for further processing to produce desired commodities including purified starch, animal feed, adhesives, and other desirable separated components, such as, polyphenols, glycoalkaloids and nutritional products.

In another aspect, the present invention provides for a separation method for separating water from starch containing liquid-type medium, the method comprising the steps of:
  providing starch containing liquid-type medium, wherein the liquid-type medium is a viscous liquid, non-viscous liquid, a suspension or an emulsion;
  providing at least one cross-flow filtration cassette comprising:
  an array of sheet members of generally rectangular and generally planar shape with main top and bottom surfaces, wherein the sheet members include in sequence in said array a first retentate sheet, a first filter sheet, a permeate sheet, a second filter sheet, and a second retentate sheet, wherein the fatty acids and triglycerides, having a diameter larger than the filter sheet's pore size, are retained in the retentate flow, and at least a portion of the liquid medium with any permeate species diffuse through the filter sheets and enter the permeate sheet and permeate flow; and
  directing the starch containing liquid-type medium through the cross-flow cassette to separate starch from the liquid-type medium.

Notably, the starch containing liquid-type medium may be pretreated to remove any unwanted material or larger solids from the liquid medium before the separation process, wherein the pretreating may include systems such as the cross-flow filtration cassette of the present invention, wherein the permeate and filter screens are sized for retention of the larger solids while allowing passage of starch content into a permeate stream, centrifuge, vibrating screen, mesh screening, belt filter, screw press, hydrocylcone and other systems that remove debris or further reduce particle size to ensure easy flow through the next separation step.

Preferably, each of the sheet members in said array has at least one inlet basin opening at one end thereof, and at least one outlet basin opening at an opposite end thereof, with permeate passage openings at longitudinal side margin portions of the sheet members, wherein each of the first and second retentate sheets having a multiplicity of channel openings therein, extending longitudinally between the inlet and outlet basin openings of the sheets in the array, and being bonded to an adjacent filter sheet about peripheral end and side portions thereof, with their basin openings and permeate passage openings in register with one another and the permeate passage openings of each of the retentate sheets being circumscribingly bonded to the adjacent filter sheet, and with a central portion of each of the retentate sheets and adjacent filter sheets being unbonded to permit permeate contacting the retentate sheet to flow through the filter sheet to the permeate sheet.

In yet a further aspect, the present invention provides for a system to process starch milk having a dry matter content of about 1% to about 60%, preferably from about 35% to about 40%, wherein the starch milk is dewatered using the system of the present invention and recuperating a dewatered starch with a water content of less than 50% residual moisture, and more preferably less than about 20% residual moisture.

Additionally, the starch content can be as low as about is 1-20% in the starch milk, and thus, there is no need for pretreatment such as use of a centrifuge or hydrocylcone. Additional drying may be necessary so that the end product meets the standards of the commercial product, as it needs dewatering of up to 20% of moisture. Importantly the dewatering step is conducted without using high temperatures, that being preferably not higher than about 35° C., in order to avoid gelatinization which destructs the granular structure of starch.

In a still further aspect, the present invention provides for a system to separate starch milk from starch containing sludge, wherein the starch containing sludge includes secondary products such as pulp and fruit water. Pulp is a major by-product that is part of sludge whether due to cutting or rasping of a starch containing plant or root and likely includes some free starch that can be removed by additional passes through the cross filtration cassettes of the present invention. Further dewatering of the pulp can be enhanced by adding $Ca(OH)_2$ to the pulp which has the ability to change the structure of pectins so that the pulp does not retain as much water and the dewatering is more effective. The end result of dewatered pulp can be used as for alternative uses such as cattle feed and other agricultural or industrial products. Additional starch can be released by processing the pulp through additional cutting or grinding steps, thereby releasing starch granules that would otherwise remain in the pulp and enabling the user to gain additional starch recovery and related revenues without diminishing the value of the pulp as cattle feed or other uses.

Tubers or root starch containing plants also include water soluble products that are transferred to a water stream used in preparation of products from such tuber or root starch containing plants. The fruit water can be used in irrigation practice but it can also be used as a medium for protein production for yeast and thus has additional value.

In yet another aspect, the present invention provides for production of food quality starch from potato starch containing sludge, wherein the potato starch containing sludge comprises starch milk including hydrolyzed and/or non-hydrolyzed starch, process or waste water, potato pulp or fibers and fruit juice, the method comprising:
a) moving the potato starch containing sludge through a first cross-flow filtration unit according to the present invention wherein such potato starch containing sludge is separated and the starch milk, waste water, fruit juice is separated into a permeate stream and the remaining potato pulp and fibers are collected for further use;

b) moving the permeate stream through a second cross-flow filtration unit according to the present invention wherein the permeate comprises waste water and fruit juice and the retentate stream includes starch milk;

c) moving the starch milk through a third cross-flow filtration unit according to the present invention, wherein the starch milk is concentrated and dewatered and wherein the removed water is directed into the permeate stream and the starch in the retentate stream is collected, wherein the starch content is at least 20% and more preferably from about 30% to 60%; and d) optionally combining the waste water and fruit juice from step b) and the water from step c) and moving into a fourth cross-flow filtration unit according to the present invention wherein the fruit juice is removed from the water thereby providing for a cleaned water stream that can be reused and the fruit juice that has been retained in the retentate stream can be collected for further use.

Other aspects and advantages of the invention will be more fully apparent from the ensuing disclosure and appended claims.

DETAILED DESCRIPTION OF THE INVENTION

The present invention is a system for treating of a starch containing solution for the separation of starch from the liquid solution.

The term "starch" refers to starches are obtained from seeds, tubers, or roots of different plants. Starch occurs in the form of tiny white granules at various sites in the plants. The diameter of the granules varies from one to 150 μm depending on the source. The term includes both hydrolyzed and non-hydrolyzed starch.

The term "cross-flow filtration cassette" refers to a type of filter module or filter cassette that comprises a porous filter element across a surface of which the liquid medium to be filtered is flowed in a tangential flow fashion, for permeation through the filter element of selected component(s) of the liquid medium. In a cross-flow filter, the shear force exerted on the filter element (separation membrane surface) by the flow of the liquid medium serves to oppose accumulation of solids on the surface of the filter element. Cross-flow filters include microfiltration, ultrafiltration, screens and nanofiltration systems. The cross-flow filter may comprise a multiplicity of filter sheets (filtration membranes) in an operative stacked arrangement, e.g., wherein filter sheets alternate with permeate and retentate sheets, and as a liquid to be filtered flows across the filter sheets, impermeate species, e.g. solids or high-molecular-weight species of diameter larger than the filter sheet's pore size, are retained and enter the retentate flow, and the liquid along with any permeate species diffuse through the filter sheet and enter the permeate flow. In the practice of the present invention, cross-flow filtration is a preferred separation method. Cross-flow filter modules and cross-flow filter cassettes useful for such filtration are commercially available from Smartflow Technologies, Inc. (Apex, N.C.). Suitable cross-flow filter modules and cassettes of such types are variously described in the following: U.S. Pat. Nos. 4,867,876; 4,882,050; 5,034,124; 5,034,124; 5,049,268; 5,232,589; 5,342,517; 5,593,580; and 5,868,930; the disclosures of all of which are hereby incorporated herein by reference in their respective entireties.

Figure 1:
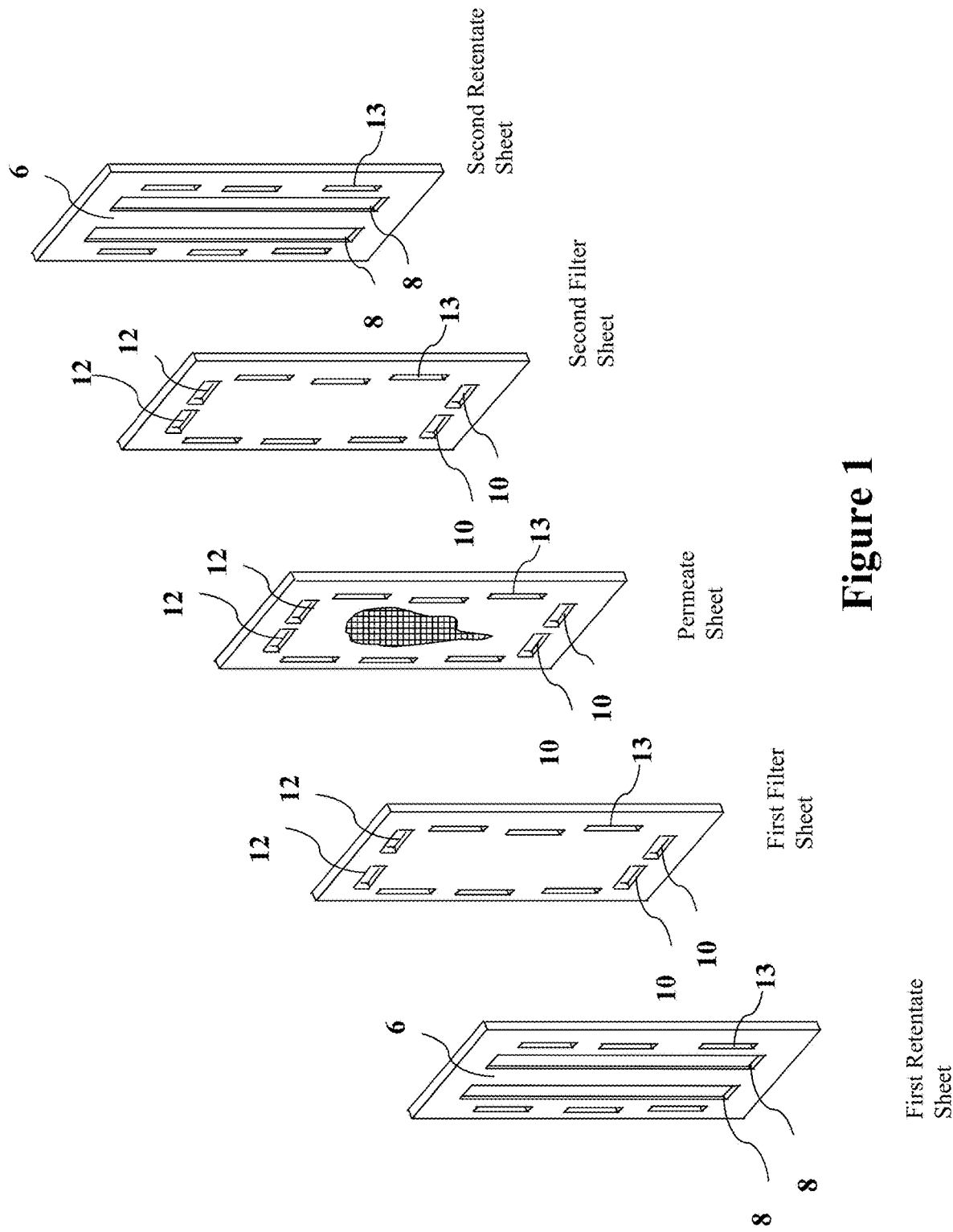
FIG. 1 shows the components of a cross-flow filtration cassette used in the separation of starch.

In one particular aspect, the present invention relates to a cross-flow filtration cassette, as shown in FIG. 1, comprising a multilaminate array of sheet members of generally rectangular and generally planar shape with main top and bottom surfaces, wherein the sheet members include in sequence in said array a first retentate sheet, a first filter sheet, a permeate sheet, a second filter sheet, and a second retentate sheet, wherein each of the permeate and filter sheet members in said array has at least one inlet basin opening 10 at one end thereof, and at least one outlet basin opening 12 at an opposite end thereof, with permeate passage openings 13 at longitudinal side margin portions of the sheet members;

a. each of the first and second retentate sheets having at least one channel opening 8 therein, extending longitudinally between the inlet 10 and outlet basin 12 openings of the permeate and filter sheets in the array, and being compression bonded to an adjacent filter sheet about peripheral end and side portions thereof, with their basin openings and permeate passage openings in register with one another and the permeate passage openings of each of the retentate sheets being circumscribingly compression bonded to the adjacent filter sheet, and with a central portion of each of the retentate sheets and adjacent filter sheets being unbonded to permit permeate contacting the retentate sheet to flow through the filter sheet to the permeate sheet; and b. each of the filter sheets being secured at its peripheral portions on a face thereof opposite the retentate sheet, to the permeate sheet.

The term "sheet" will denote the generally planar members of the cassette, the cassette thus comprising an assembly of permeate sheets, filter sheets, and retentate sheets, coupled to one another in such manner as to permit flow of the fluid to be separated through the flow channel(s) of the device, for mass transfer involving passage of the permeate through the filter sheets, and retention of the retentate on the side of the filter sheet opposite the side from which the permeate emerges.

The term "compressible" in reference to the retentate sheet or other structural feature or sheet member of the present invention means that such component or member is compressively deformable by application of load or pressure thereon.

The above-described filtration cassette of the invention comprises a "base sequence" of elements, defined as a sequence of sheet elements constituting a compressible retentate sheet (hereafter designated by the symbol "CR"), a filter sheet (hereafter designated by the symbol "F"), a foraminous permeate sheet (hereafter designated by the symbol "P"), a second filter sheet ("F"), and a second compressible retentate sheet ("CR"), thereby providing a sequence of sheet elements, CR/F/P/F/CR.

Figure 2:
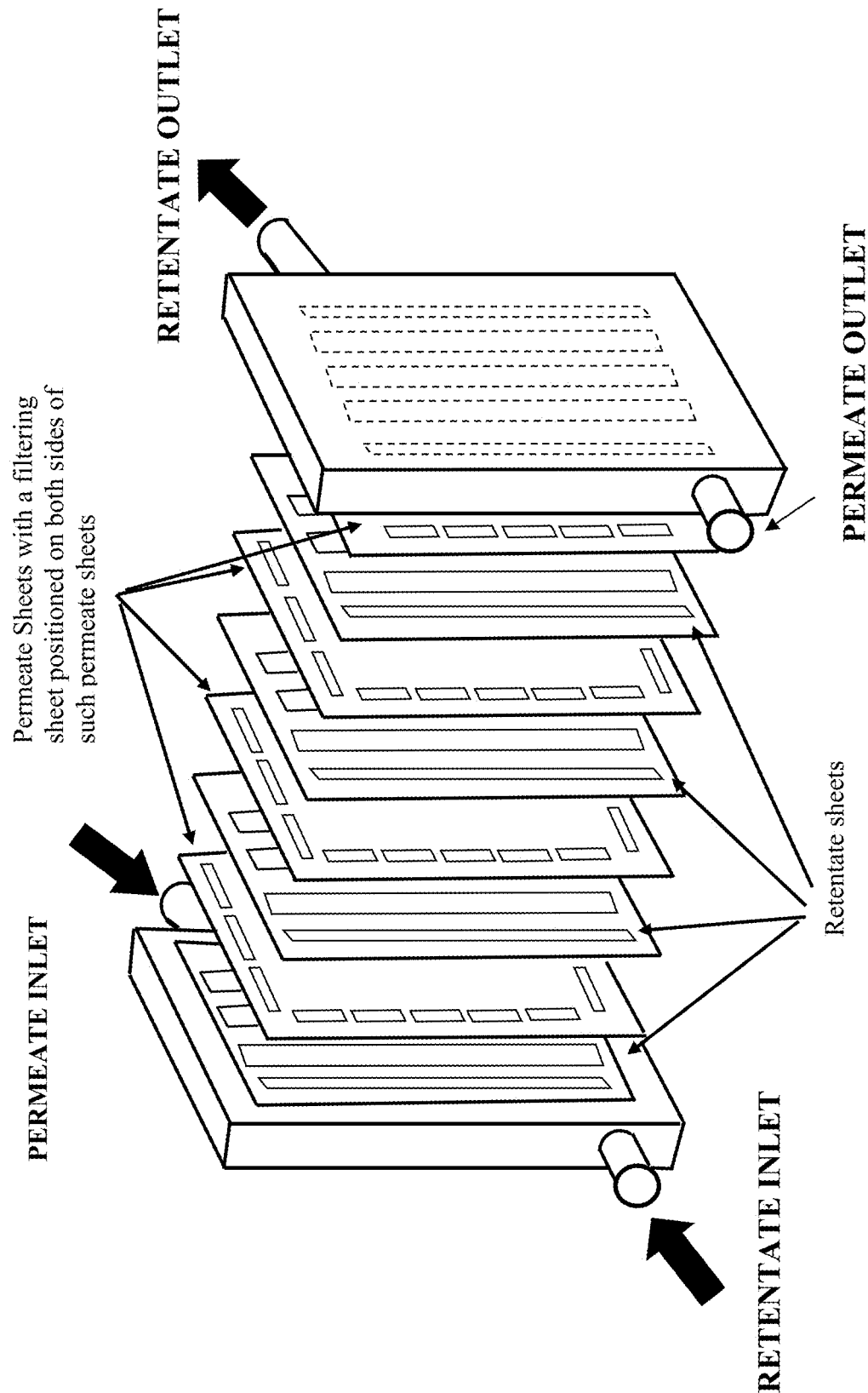
FIG. 2 shows the flow pattern of the retentate through a multiplicity of sheets adapted to end plates with retentate inlet and outlet and permeate inlet and outlet.

The base sequence of sheet elements may be utilized in construction of filters comprising a plurality of filtration cassettes, wherein the compressible retentate sheet is utilized to seal the top and bottom elements of a plurality of filtration cassettes of a sequence, comprising compressible retentate sheet "CR", filter sheet "F", foraminous permeate sheet P, filter sheet "F", non-compressible retentate sheet "R", filter sheet "F", foraminous permeate sheet P, filter sheet "F", and compressible retentate sheet "CR". An illustrative stacked cassette filter according to the invention may for example feature the sheet sequence CR/F/P/F/R/F/P/F/R/F/P/F/CR as shown in FIG. 2, comprising a first compressible retentate sheet, two base sequences of sheets FPFRFPF in a repetitive sequence, and a second compressible retentate sheet. In all repetitive sequences, other than a single cassette base sequence, the following relationship is observed: where X is the number of filter sheets F, the quantity 0.5 X−1 is the number of non-compressible retentate sheets R, and the quantity 0.5 X is the number of foraminous permeate sheets P, with two compressible retentate sheets being utilized to seal the top and bottom extremities of the intervening sequence. The cassettes may also be used in series or parallel.

Thus, it is possible to utilize a large number of base sequence cassettes in a repetitive sequence, to provide a stacked cassette filter of the desired mass transfer area. Many configurations are possible. It is feasible in some instances, e.g., for mass transfer studies and system quantitation, to utilize a single cassette comprising the base sequence CR/F/P/F/CR wherein the outermost retentate sheets in the sequence are compression-sealed at their outer faces to an end plate accommodating removal of permeate from the permeate passage openings of the constituent sheet members in the cassette.

The sheets of filter material used in the cassette article of the present invention may be of any suitable porosity rating. As used herein, the porosity rating of a sheet of filter material is the smallest particle size which cannot pass through the pores of the filter material. Typical porosity ratings are expressed in molecular weight (MW), a salt rejection rate, or micrometer units, e.g., a 2 micron filter media sheet being a material which will pass particles smaller than 2 microns in diameter through the pores of the material, while particles larger than 2 microns will not be passed through the filter material, and a salt rejection rate of 99% will retain 99% of a given salt or small molecular with compound ($MgSO_4$, for example) and allow water or smaller molecules to pass through at a given set of conditions of pressure, crossflow rate and temperature, and as a further example, a 10,000 MW filter media sheet being a material which will pass particles smaller than 10,000 MW in diameter through the pores of the material, while particles larger than 10,000 MW will not be passed through the filter material.

In one preferred embodiment of the cassette article of the present invention, a retentate sheet is provided with a plurality of transversely spaced-apart, longitudinally extending ribs or partitions, extending upwardly from (the central portion of) each of the main top and bottom faces of the retentate sheet, such ribs or partitions being of substantially the same height and substantially parallel to one another to define a series of channels between the partitions, extending longitudinally between the respective basin openings of the retentate sheet, on both faces thereof. The adjacent filter sheets may be further bonded to the outer extremities of the ribs or partitions, and the ribs or partitions may be formed of any suitable material, e.g., a flexible resilient adhesive bonding medium, such as a urethanes, epoxy or silicone adhesive sealant medium, e.g., applied in a "bead" in the longitudinal direction of the retentate sheet on both main top and bottom faces thereof.

The term "bonded" in reference to adjacent sheets in the multilaminate cassette means that the adjacent sheets are secured to one another in such manner as to prevent flow of the material being processed, e.g., the feed material to be separated, as well as component materials therefrom (filtrate or permeate, as well as retentate), from flowing through such secured areas or between the adjacent sheets at such secured areas. Preferably, the bonding is carried out by compressive bonding or with a suitable adhesive or sealant medium, e.g., a urethane, epoxy, cyanoacrylate, or silicone adhesive material, which fills the interstices of the foraminous sheet in the bonded pair of sheets, and adhesively joins one of the adjacent sheets to the other in the bonded areas.

The term "compressive bonding" and "compressively bonded" refer to bonding and bonding operations in which the structure being bonded is subjected to a compressive load or force, for sufficient time and under sufficient period to effect the bonding securement of the structure. Compressive bonding of laminae in the practice of the invention is highly desirable, in order to assure the leak-tightness and structural integrity of the resulting multilaminate assembly of the cassette.

The invention may for example be carried out with bonding of sheets in the multilaminate array to one another with cyanoacrylate or other "fast" adhesives, or alternatively the adhesive or sealant medium may require extended cure at ambient temperature or other appropriate cure conditions, and it may be advantageous to conduct such cure with the laminate structure in a fixture or other assembly in which the compressive bonding is effectively completed.

In a specific aspect of the invention, each of the foraminous permeate sheets may constitute a foraminous material of from about 80 to about 300 mesh size. Each of the foraminous permeate sheets may for example comprise a woven polymeric mesh, e.g., of a material selected from the group consisting of polyester, polypropylene, nylon, fluorocarbon polymers such as polytetrafluoroethylene, polyethylene, and polysulfone, and composites comprising one or more of such materials.

The filter sheets used in the filtration cassette of the present invention may be of any suitable materials, such as a material selected from the group consisting of cellulose, polyphenylene oxide, polysulfone, cellulose nitrate, cellulose acetate, regenerated cellulose, polyether amide, polyphenylene oxide/polysulfone blends, mixed esters of cellulose, and polyether sulfone.

Furthermore, it is possible to optimize the separate processes with cross-flow filtration modules of variable channel velocities but of uniform channel heights, given the fact that most commercial cross-flow modules are only available in a single channel height. When the channel height of a cross-flow filtration module is known, shear is directly proportional to channel velocity of such module for the same solution passing by.

In the literature, numerous techniques have been proposed to effect the separation of target substances using membrane separations with addition of foreign substances such as acid, base, salt and solvents. In contrast to these chemical additives-based methods, the methodology of the present invention permits a target substance to be separated from an input fluid by the simplest mechanical means. In the use of cross-flow filtration modules of the type described in the aforementioned patents, the specificity and speed of a desired separation is effected by a) fluid distribution in the cross-flow module, b) channel height of the cross flow module, c) channel length, d) shear rate, e) membrane pore structure, f) membrane structure, g) membrane chemistry, h) trans-membrane pressure, and i) pressure drop, which is a function of channel length, velocity and solution viscosity.

The approaches by others involving various additives and manipulations of transmembrane pressure appear to be predicated on overcoming problems created by poor distribution of flow within the cross-flow module. It is not to say that the addition of salts and solvents do not have a place in separation but without proper flow distribution the membrane separation cannot be optimally operated nor will cleaning techniques be fully beneficial. It will be appreciated, based on the disclosure herein that numerous heretofore expensive or difficult separations are rendered far simpler and more economical by employing the techniques described herein.

Thus, the invention relates in another aspect to optimizing the membrane separation process, comprising:
a. selecting a cross-flow membrane module wherein the distance from the inlet port to the outlet port is equidistant from the inlet to outlet for each sub-channel of the device, i.e., each sub-channel is of a same dimensional character;
b. selecting an optimal channel height;
c. selecting an optimal shear rate and/or channel velocity;
d. selecting an optimal transmembrane pressure;
e. selecting an optimal rejection characteristics of the filter membrane;
f. selecting an optimal temperature;
g. selecting an optimal channel length; and
h. selecting an optimal pressure drop which is the composite of
i. the optimal channel height;
j. the optimal shear rate and/or channel velocity;
k. optimal channel length; and
l. the viscosity of the solution being filtered.

Selecting a channel height can be performed mathematically or empirically by trial and error noting that the starch solution is frequently non-Newtowian. The objective of channel selection is to minimize channel height with three critical stipulations: first, the channel must be sufficiently high to allow the unrestricted passage of any larger material such as clumped cells; second, the channel should not cause excessive pressure drop and loss of linear efficiency; and third, the channel should be sufficiently high as to allow the proper angle of attack for substances to encounter the membrane pore and pass through the pore. The optimal channel height is dependent on the length and viscosity of the solution.

Several notable observations have been made in initial trials and process scale-up, as discussed below.

For suspensions having an optical density (OD) of 2 to 500, and a path length of 6 to 12 inches, start with a channel height between 0.4 to 0.75 mm. If the inlet pressure is above 15 PSIG at a velocity of 2.0 M/sec, then the channel is too thin.

For suspensions having an optical density (OD) of 2 to 500, and a path length of 6 to 12 inches, start with a channel height between 0.4 to 0.75 mm. If the inlet pressure is below 5 PSIG at a velocity of 2.0 M/sec the channel is too high.

For suspensions having an optical density (OD) of 2 to 500, and a path length of 25 to 40 inches, start with a channel height between 0.7 to 1.0 mm. If the inlet pressure is above 15 PSIG at a velocity of 2.0 M/sec, the channel is too thin.

For suspensions having an optical density (OD) of 2 to 500, and a path length of 25 to 40 inches, start with a channel height between 0.7 to 1.0 mm. If the inlet pressure is below 5 PSIG at a velocity of 2.0 M/sec, the channel is too high.

Another aspect of the present invention relates to a stacked cassette cross-flow filter comprising cassette articles of the type described above.

Still another aspect of the present invention relates to a pair of end plates or manifold assembly in which the cassettes are secured for operation as shown in FIG. 2.

Figure 3:
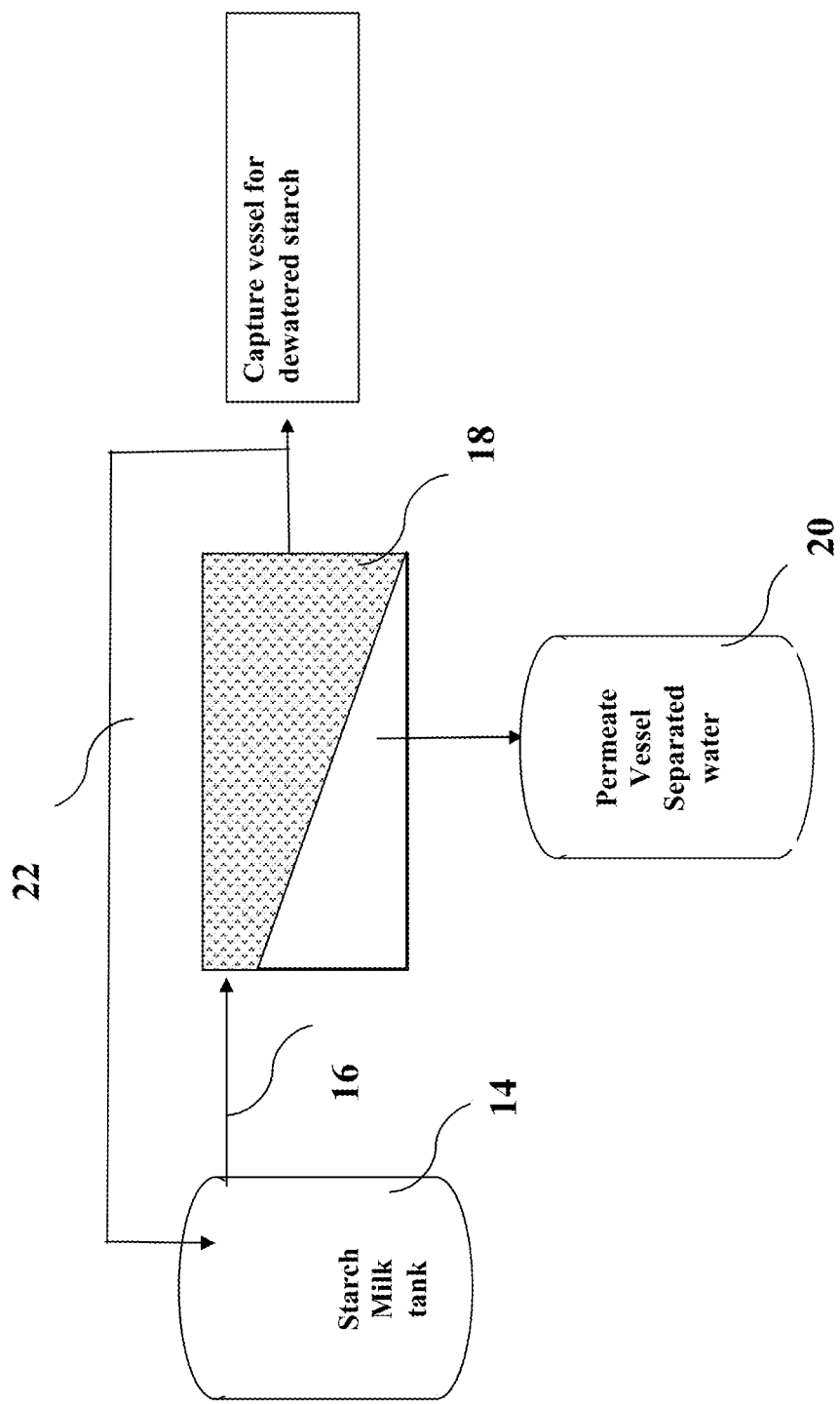
FIG. 3 shows a system for dewatering a tank of collected starch milk.

FIG. 3 shows a system for dewatering a tank 14 of collected starch milk. The starch milk is removed from the tank and is introduced to the cross-flow filtration cassette 18 wherein the starch milk is separated into a retentate and a permeate stream. The retentate stream comprising the dewatered starch may be returned to the tank via process line 22 for further dewatering or sent on for further processing (not shown). The permeate (separated water) is introduced to the permeate vessel 20. Notably, the permeate can be further filtered using a second cross-flow filtration cassette of the present invention to further remove impurities and provide purified water that can be imported into a wastewater stream.

The components of the cross-flow filtration cassette 18 are described in FIG. 1 and relates to a filtration cassette comprising a multilaminate array of sheet members of generally rectangular and generally planar shape with main top and bottom surfaces, wherein the sheet members include:
a. a first compressible retentate sheet of suitable material, e.g. polysulfone, polyethersulfone, polycarbonate, urethane, silicone, or other compressible material of construction, having (i) at least one longitudinally extending rib or partition element 6, such partition element(s) when provided in multiple configuration being transversely spaced apart from one another and being of substantially the same height and substantially parallel to one another to define a single or a series of channels 8 between the partitions, extending longitudinally between the respective inlet 10 and outlet 12 basin openings of associated filter elements and permeate sheet members, on both faces thereof, (ii) permeate passage openings 13 at side portions of the sheets, and (iii) the retentate sheet aligned to the first sheet of filter material at respective end and side portions thereof, with the basin openings and permeate passage openings of the associated sheet members in register with one another and the permeate passage opening of the retentate sheet member being circumscribingly compressed to the first sheet of filter material, and with a central portion of the first sheet of filter material and the retentate sheet member being unbonded to permit permeate contacting the retentate sheet member to flow through the first sheet member of filter material to the foraminous permeate sheet member;
b. a first sheet member of filter material having (i) multiple basin openings, of a suitable shape, e.g., polygonal, semicircular, or sector shape, at each of opposite end portions of the sheet member defining respective inlet 10 and outlet 12 passages, each basin being bounded by generally linear side edges defining corners of the basin at respective intersections of the side edges, and (ii) permeate passage openings 13 at the side portions of the sheet member, wherein the first sheet member of filter material is bonded to the foraminous permeate sheet member at their respective end and side portions, with their basin openings and permeate passage openings in register with one another and the basin openings being circumscribingly bonded at respective end portions of the first sheet member of filter material and the foraminous permeate sheet member, and with a central portion of the first sheet member of filter material and the foraminous permeate sheet member being unbonded so as to define a central portion permeate channel of the foraminous permeate sheet communicating with the permeate passages in the first sheet member of filter material and in the foraminous permeate sheet member;

c. a foraminous permeate sheet member of screen or mesh material, having (i) multiple basin openings of suitable shape at each of opposite end portions of the sheet member defining respective inlet 10 and outlet 12 passages, each basin being bounded by generally linear side edges defining corners of the basin at respective intersections of the side edges, and (ii) permeate passage openings 13 at the side portions of the sheet member;

d. a second sheet member of filter material having (i) multiple basin openings at each of opposite end portions of the sheet member defining respective inlet 10 and outlet 12 passages, each basin being bounded by generally linear side edges defining corners of the basin at respective intersections of the side edges, and (ii) permeate passage openings 13 at the side portions of the sheet member, wherein the second sheet member of filter material is compression sealed to the retentate sheet member at their respective end and side portions, with their basin openings and permeate passage openings in register with one another and the permeate passage opening of the retentate sheet member being compression sealed to the second sheet member of filter material, and with a central portion of the second sheet member of filter material and the retentate sheet member being unbonded to permit permeate contacting the retentate sheet member to flow through the second sheet member of filter material; and e. a second compressible retentate sheet member of suitable material, e.g. polysulfone, polyethersulfone, polycarbonate, urethane, silicone, having (i) at least one longitudinally extending rib or partition element 6, provided that when multiple partition elements are employed, the partition elements are transversely spaced-apart from one another, such partition elements being of substantially the same height and substantially parallel to one another, to define a single channel 8 or a series of channels between the partitions, extending longitudinally between the respective inlet and outlet basin openings of the filter elements and permeate sheet members, on both faces thereof, (ii) permeate passage openings 13 at the side portions of the sheet member, and (iii) the retentate sheet compression sealed to the second sheet of filter material at respective end and side portions thereof, with their basin openings and permeate passage openings in register with one another and the permeate passage opening of the retentate sheet member being compression sealed to the second sheet member of filter material, and with a central portion of the first sheet member of filter material and the retentate sheet member being unbonded to permit permeate contacting the retentate sheet member to flow through the second sheet member of filter material to the foraminous permeate sheet member.

In operation, the cross-flow filtration cassette provides a barrier through which the starch is substantially restricted from passing through the filter sheets and allows the starch concentration to be increased.

After passing through the cross-flow filtration cassette, the permeate preferably includes a greatly reduced amount of starch. The retentate, which is returned to tank and cassette may still include some water and thus can be recirculated again. The water permeate may be further purified with the use of a second cross-flow filtration cassette wherein the pores of the filter sheet comprises a smaller diameter than the originally used cassette.

Figure 4:
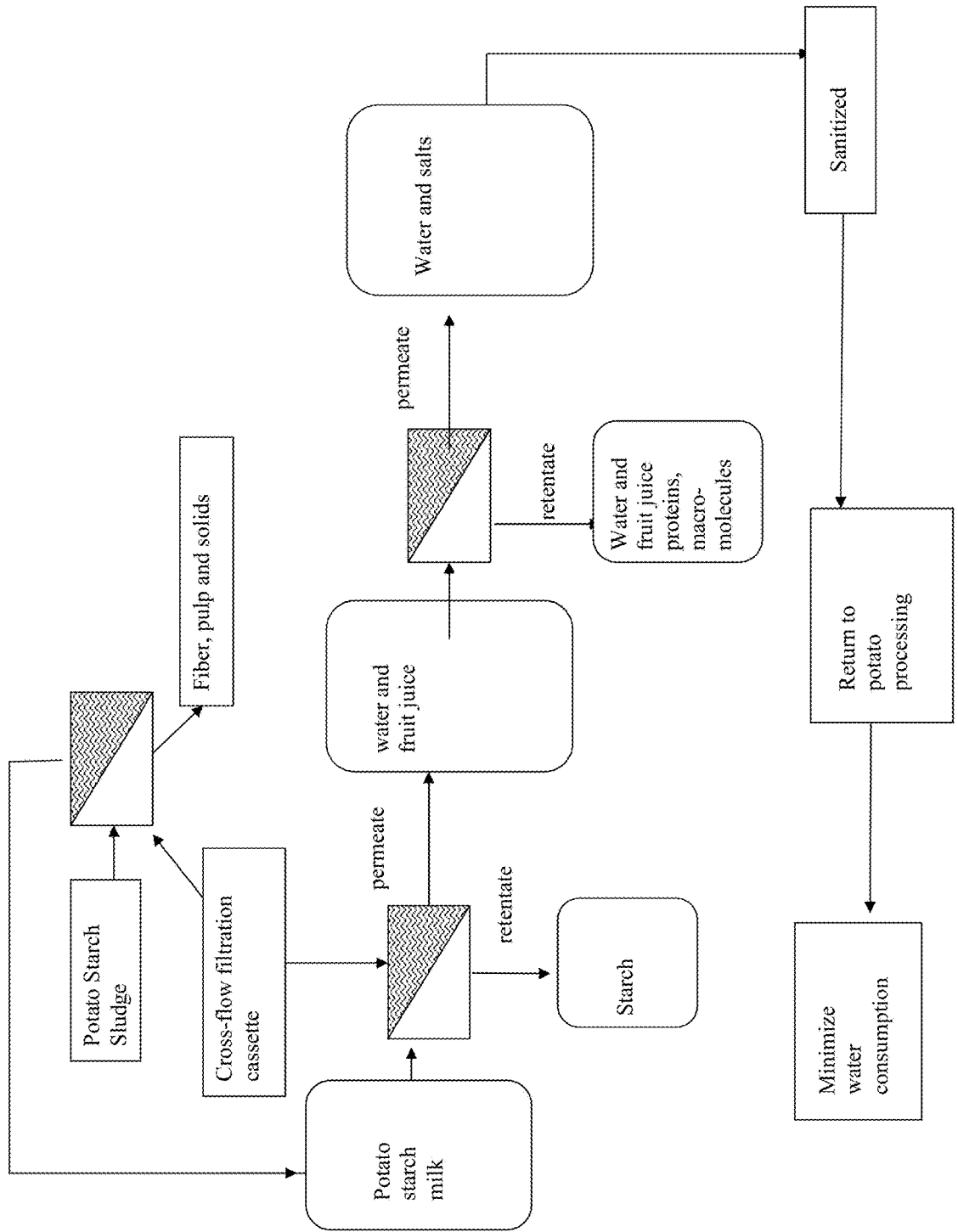
FIG. 4 shows the separation of purified starch from potato starch containing sludge.

FIG. 4 shows the starch process and illustrates one embodiment for separating purified starch from potato starch containing sludge. Initially, the potato starch containing sludge, comprising starch pulp/fibers, starch milk, fruit juice water and process or waste water is first treated to remove large pulp and fibers that are retained in the retentate stream for further treatment or use as an animal feed. The permeate stream is moved on to another cross-flow filtration cassette of the present invention wherein the process or waste water and fruit juices are separated from the starch milk and the remaining retentate includes the purified and concentrated starch product.

That which is claimed is:

1. A method of processing a starch-containing source, said method comprising:
   subjecting process water comprising starch to a pretreatment to remove any unwanted solids, pulp, fibers, or debris;
   removing water from the process water using a first cross-flow filtration cassette to yield a first permeate stream and a retentate starch stream; and,
   moving the first permeate stream to a second cross-flow filtration cassette to remove organic or inorganic products that passed through the first cross-flow filtration cassette to yield a second permeate stream and a second retentate stream.

2. The method of claim 1, wherein the pretreatment comprises using a centrifuge, a vibrating screen, mesh screening, a belt filter, a screw press, or a hydrocyclone.

3. The method of claim 1, wherein a filtration membrane of the second cross-flow filtration cassette has a smaller pore size than a filtration membrane of the first cross-flow filtration cassette.

4. The method of claim 1, wherein the cross-flow filtration cassettes each comprise an array of sheet members of generally rectangular and generally planar shape with main top and bottom surfaces, wherein each of the arrays of sheet members include, in sequence, a first retentate sheet, a first filter sheet, a permeate sheet, a second filter sheet, and a second retentate sheet, and wherein a pore size of the first and second filter sheets of each of the arrays is less than a particle size of starch such that the starch is retained in the retentate starch stream and the second retentate stream, respectively, and water diffuses through the first and second filter sheets of each of the arrays to enter the first and second permeate streams, respectively.

5. The method of claim 4, wherein each of the sheet members in said arrays have at least one inlet basin opening at one end thereof, and at least one outlet basin opening at an opposite end thereof, with permeate passage openings at longitudinal side margin portions of the sheet members, wherein each of the first and second retentate sheets have a multiplicity of channel openings, extending longitudinally between their inlet and outlet basin openings, and the first retentate sheet and the second retentate sheet, respectively, are bonded to the first filter sheet and the second filter sheet about peripheral end and side portions thereof, and,
   wherein, for each of the arrays, the inlet basin openings, the outlet basin openings, and the permeate passage openings are in register with one another and the permeate passage openings of each of the retentate sheets are circumscribingly bonded to an adjacent filter sheet, with a central portion of each of the retentate sheets and adjacent filter sheets being unbonded to permit permeate contacting the retentate sheets to flow through the filter sheets to the permeate sheet.

6. The method of claim 1, wherein the process water comprises starch from at least one species selected from the group consisting of potatoes, sweet potatoes, wheat, corn, tapioca, yams, cassava, sago, rice, pea, broad bean, horse bean, sorghum, konjac, rye, buckwheat and barley.

7. The method of claim 1, wherein the starch comprises hydrolyzed and/or unhydrolyzed starch.

8. The method of claim 1, wherein the biological oxygen demand (BOD) and/or total suspended solids (TSS) levels of the process water are reduced by the step of moving the first permeate stream to a second cross-flow filtration cassette.

9. The method of claim 1, wherein the second permeate stream is essentially clear water.

\* \* \* \* \*